US010104013B2

(12) United States Patent
Lee

(10) Patent No.: US 10,104,013 B2
(45) Date of Patent: Oct. 16, 2018

(54) OPENFLOW CONTROLLER AND SWITCH INSTALLING AN APPLICATION

(71) Applicant: NANNING FUGUI PRECISION INDUSTRIAL CO. LTD., Nanning (CN)

(72) Inventor: Tsung-Hsien Lee, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 95 days.

(21) Appl. No.: 15/011,634

(22) Filed: Jan. 31, 2016

(65) Prior Publication Data

US 2016/0234132 A1    Aug. 11, 2016

(30) Foreign Application Priority Data

Feb. 10, 2015  (TW) .............................. 104104455 A

(51) Int. Cl.
| | | |
|---|---|---|
| *H04L 12/947* | (2013.01) | |
| *H04L 12/24* | (2006.01) | |
| *H04L 12/771* | (2013.01) | |
| *H04L 12/715* | (2013.01) | |

(52) U.S. Cl.
CPC .............. *H04L 49/25* (2013.01); *H04L 41/00* (2013.01); *H04L 45/56* (2013.01); *H04L 45/64* (2013.01)

(58) Field of Classification Search
None
See application file for complete search history.

(56) References Cited

U.S. PATENT DOCUMENTS

| | | | |
|---|---|---|---|
| 2007/0220506 A1 | 9/2007 | Maruyama | |
| 2011/0078675 A1 | 3/2011 | Van Camp et al. | |
| 2015/0009830 A1* | 1/2015 | Bisht | H04L 47/125 370/236 |
| 2015/0124812 A1* | 5/2015 | Agarwal | H04L 45/24 370/392 |
| 2015/0156122 A1* | 6/2015 | Singh | H04L 47/20 370/235 |
| 2015/0326425 A1* | 11/2015 | Natarajan | H04L 41/0654 370/216 |
| 2015/0355899 A1* | 12/2015 | Agarwal | G06F 8/68 717/170 |
| 2016/0014036 A1* | 1/2016 | Oikawa | H04L 45/308 370/235 |
| 2016/0041819 A1* | 2/2016 | Mantena | G06F 8/65 717/170 |

(Continued)

FOREIGN PATENT DOCUMENTS

| | | |
|---|---|---|
| CN | 101038554 | 9/2007 |
| CN | 102045390 A | 5/2011 |

(Continued)

*Primary Examiner* — Benjamin Lamont
(74) *Attorney, Agent, or Firm* — ScienBiziP, P.C.

(57) ABSTRACT

A control device which is in communication with a switch comprises a memory which stores applications. The applications can handle received data streams of the switch. The control device selects first applications from all the applications and transmits the first applications and a command to the switch to install the first applications. The switch itself transmits received data streams to the first applications for processing when external data streams are received.

20 Claims, 7 Drawing Sheets

(56) References Cited

U.S. PATENT DOCUMENTS

| | | | |
|---|---|---|---|
| 2016/0057052 A1* | 2/2016 | Zhang | H04L 45/28 |
| | | | 709/239 |
| 2016/0112502 A1* | 4/2016 | Clarke | H04L 67/104 |
| | | | 709/201 |
| 2016/0218957 A1* | 7/2016 | Liang | H04L 45/64 |
| 2016/0255011 A1* | 9/2016 | Karino | H04L 69/40 |
| | | | 370/235 |
| 2016/0285682 A1* | 9/2016 | Nagakura | H04L 12/4675 |
| 2016/0285737 A1* | 9/2016 | Higuchi | H04L 45/64 |
| 2016/0323189 A1* | 11/2016 | Ahn | H04L 47/24 |
| 2017/0048115 A1* | 2/2017 | Wang | H04L 41/082 |
| 2017/0142026 A1* | 5/2017 | Klaedtke | H04L 47/803 |

FOREIGN PATENT DOCUMENTS

| | | |
|---|---|---|
| CN | 103607379 A | 2/2014 |
| CN | 104247345 A | 12/2014 |
| CN | 104272650 A | 1/2015 |

\* cited by examiner

OPENFLOW CONTROLLER AND SWITCH INSTALLING AN APPLICATION

FIELD

The subject matter herein generally relates to network communication technology.

BACKGROUND

Open Flow enables network controllers to determine the path of network packets across a network of switches. The controllers are distinct from the switches. This separation of the control from the act of forwarding allows for more sophisticated traffic management than is feasible using access control lists (ACLs) and routing protocols. Also, Open Flow allows switches from different vendors, often each with their own proprietary interfaces and scripting languages, to be managed remotely using a single, open protocol. The protocol's inventors consider Open Flow an enabler of Software Defined Networking (SDN).

Open Flow allows remote administration of a layer 3 switch's packet forwarding tables, by adding, modifying, and removing packet matching rules and actions. This way, routing decisions can be made periodically or ad hoc by the controller and translated into rules and actions with a configurable lifespan, which are then deployed to a switch's flow table, leaving the actual forwarding of matched packets to the switch at wire speed for the duration of those rules. Packets which are unmatched by the switch can be forwarded to the controller. The controller can then decide to modify existing flow table rules on one or more switches or to deploy new rules, to prevent a structural flow of traffic between switch and controller. The controller can even decide to forward the traffic itself, provided that it has told the switch to forward entire packets instead of just their header.

However, SDN architecture may bring the following problems. First, data streams are repeated back and forth between a control device and a switch, as well as between the switches. Second, the out-of-band signal management port of the switch limits communication speed between the switch and the control device. Solving these shortcomings is problematic.

BRIEF DESCRIPTION OF THE DRAWINGS

Implementations of the present technology will now be described, by way of example only, with reference to the attached figures, wherein.

DETAILED DESCRIPTION

Figure 1:
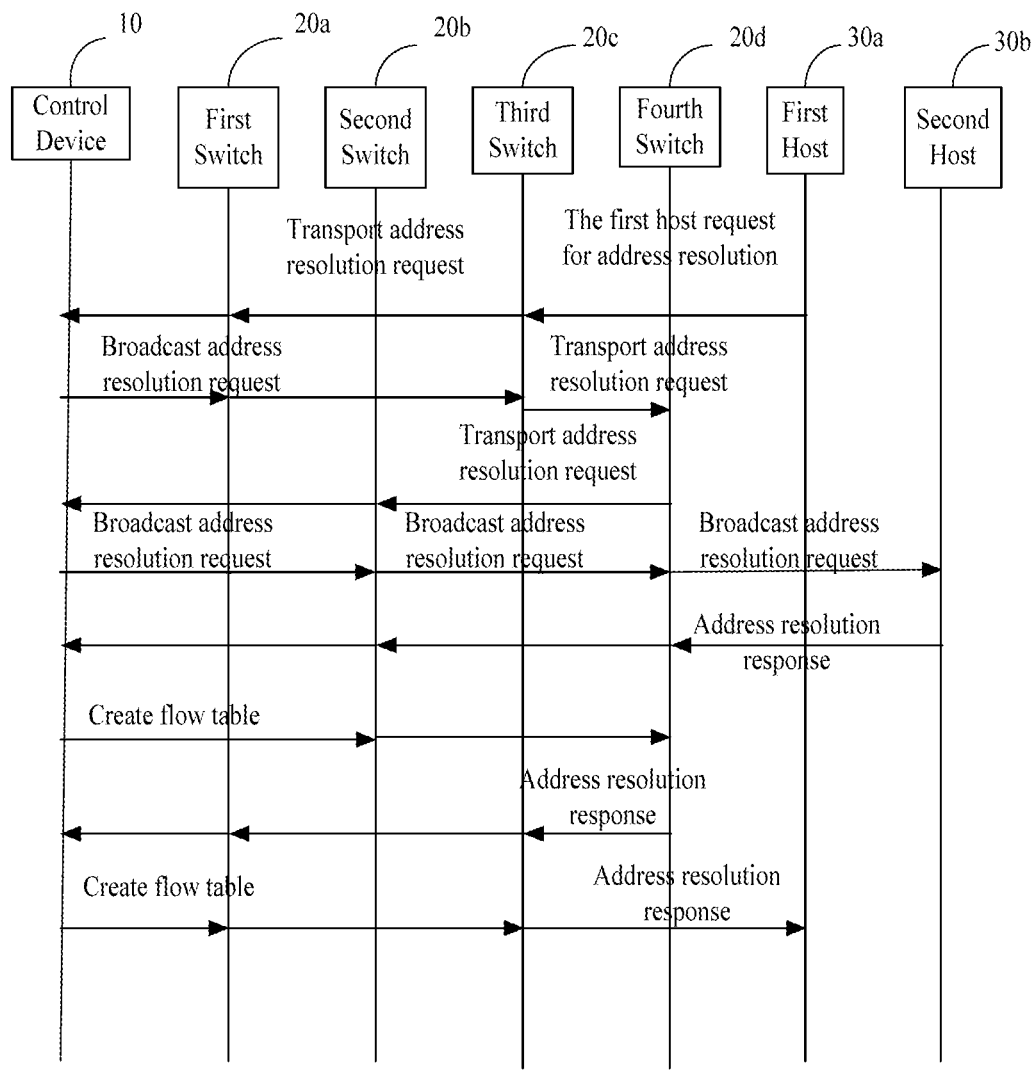
FIG. 1 is a workflow of an address analysis implemented to data streams under the SDN architecture.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

It should be noted that references to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

Figure 2:
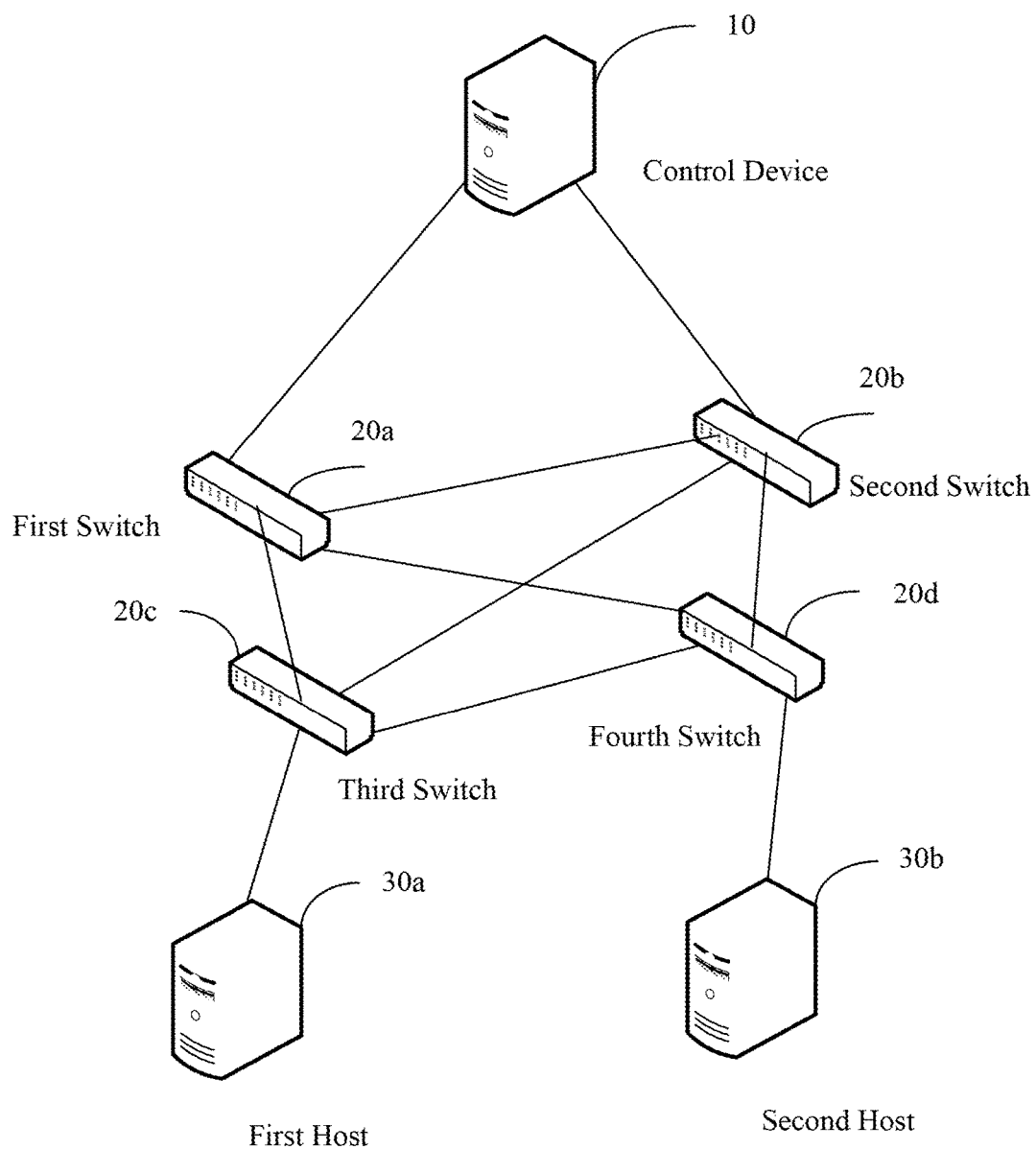
FIG. 2 is a diagrammatic view of an operating environment comprising a control device and a first switch.

FIG. 1 shows a workflow process of address analysis implemented in respect of data streams under the SDN architecture. FIG. 2 illustrates a control device 10, a first switch 20a, a second switch 20b, a third switch 20c, and a fourth switch 20d. The first switch 20a and the second switch 20b are configured as core devices, the third switch 20c and the fourth switch 20d are configured as edge devices. The control device 10 directly connects to the first switch 20a and the second switch 20b. Every one of the first switch 20a, the second switch 20b, the third switch 20c, and the fourth switch 20d is connected to the others. The third switch 20c connects to a first host 30a. The fourth switch 20d connects to a second host 30b.

This disclosure presents a solution for the problem of data streams being repeated back and forth between the control device and the switch, as well as between the switches, and the problem of a limited communication speed between the switch and the control device due to a out-of-band signal management port of the switch. In one embodiment, the control device 10 stores applications, each of the applications is able to process a data stream. The applications comprise an address analysis application for processing data streams and other applications implementing network functions for implementing, for example, routing paths and firewalls. Before the switch receives the data streams, the control device installs first applications to the switch, and the switch then transmits the received data streams to the first applications for identification processes. It is not required for the switch to transmit all the data streams to the control device, which avoids the problem of transmitting the data streams repeatedly between the control device and the switch. As a result, a data flow between the switch and the control device is greatly reduced, so that the problem of a limited communication speed between the switch and the control device due to a out-of-band signal management port of the switch is overcome.

Figure 3:
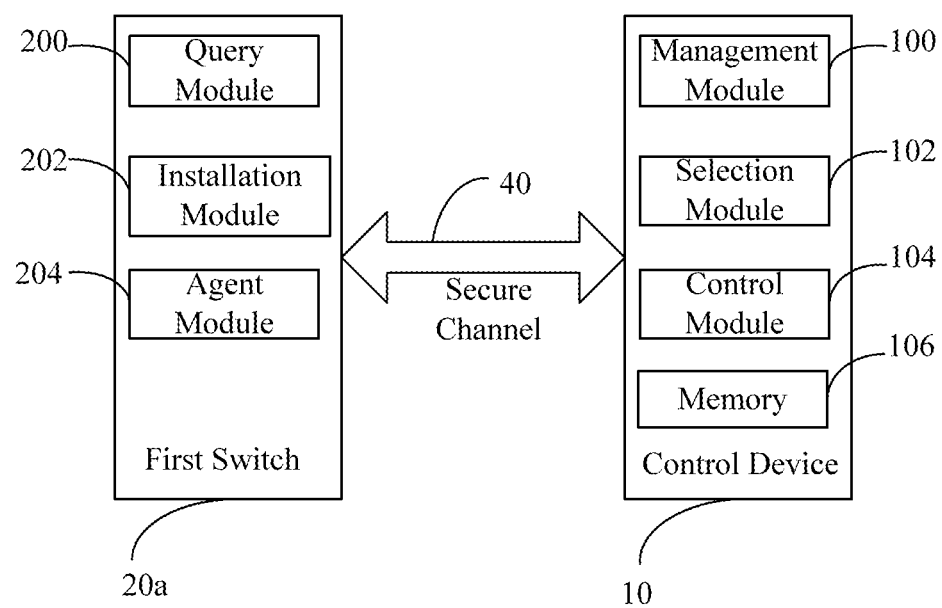
FIG. 3 is a block diagram of an embodiment of function modules of the control device and a first switch of FIG. 2.

FIG. 3 is a block diagram of an embodiment of function modules of the control device 10 and the first switch 20a. In this embodiment, the control device 10 and the first switch 20a are applied in the operating environment shown in FIG. 2. The first switch 20a connects to the control device 10 through a secure channel 40 via an out-of-band signal management port. Also, the second switch 20b connects to the control device 10 through a secure channel 40 via an out-of-band signal management port. The structure and functions of the first switch 20a are similar or equal to those of the second switch 20b.

In an embodiment, the control device 10 comprises a management module 100, a selection module 102, a control module 104, and a memory 106. Multiple applications are stored in the memory 106, each of which processes a data stream. The first switch 20a comprises a query module 200, an installation module 202, and an agent module 204.

The management module 100 of the control device 10 transmits a query to the first switch 20a for retrieving an installation table from the switch. The installation table is created by the first switch 20a according to the installed applications therein. The applications installed in the switch 20a are configured to process data streams received by the switch, and at least comprise an address resolution application, Layer2 learning programs, a routing application, and a firewall procedure. Each of the installed applications is assigned an identification (ID) number.

The query module 200 of first switch 20a receives a query from the control device 10 for obtaining applications installed in the first switch 20a, and the first switch 20a creates an installation table according to the applications installed in the switch. The installation table is then transmitted to the control device 10.

The selection module 102 of the control device 10 receives the installation table from the first switch 20a, selects second applications outside of the installation table from the memory 106, divides third applications from the second applications into blocks, and labels the blocks block 1, block 2, . . . , block n.

The control module 104 of the control device 10 transmits the second applications according to packet information (bundle message) of the extended Open Flow specification. Information including the bundle message (bundle information) comprises a signaling type, an application name, and a block label.

The control module 104, for example, transmits an application, named App-ID and labeled as block 1, . . . block n, to the first switch 20a. The bundle information sent by the control module 104 is shown below:

bundle message 1: OFPBCT-OPEN-APP-REQUEST App-ID;
bundle message 2: OFPT-BUNDLE-ADD-MESSAGE App-ID block 1;
bundle message 3: OFPT-BUNDLE-ADD-MESSAGE App-ID 2 to block n−1;
bundle message 4: OFPT-BUNDLE-ADD-MESSAGE App-ID block n;
bundle message 5: OFPBCT-CLOSE-APP-REQUEST App-ID; and
bundle message 6: OFPBCT-COMMIT-REQUEST App-ID.

Bundle message 1 is control information for enabling the control device 10 to request the first switch 20a to start downloading the App-ID application. The bundle message 2 is control information for enabling the control device 10 to request the first switch 20a to start downloading block 1 of the App-ID application. Bundle message 3 is control information enabling the control device 10 to request the first switch 20a to start downloading the block2 to block n−1 of the App-ID application. Bundle message 4 is control information enabling the control device 10 to request the first switch 20a to start downloading the block n of the App-ID application. Bundle message 5 is control information enabling the first switch 20a to terminate downloading of the App-ID application. Bundle message 6 is control information enabling the first switch 20a to install the App-ID application.

The following describes specific process of transmitting the App-ID application by the control module 104, according to the bundle information. The installation module 202 of the first switch 20a receives the bundle message 1 from the control module 104 and analyzes whether the App-ID application has been installed. If the App-ID application has been installed, it returns the information to the control device 10 to end the download process. If not installed, it returns acknowledgement of receipt of information to the control device 10 and that it is ready to receive the App-ID application. The control module 104 transmits the bundle message 2 to the first switch 20a after receiving acknowledgement of receipt and transmits block 1 of the App-ID application to the first switch 20a. The block 1 is received by the installation module 202. The control module 104 continues to transmit the other blocks to the first switch 20a, until all of the blocks are received by the installation module 202. The control module 104 transmits the bundle message 5 to enable the first switch 20a to terminate downloading of the App-ID application, and transmits bundle message 6 to enable the first switch 20a to install the App-ID application. The installation module 202 of the first switch 20a terminates downloading of the App-ID application and installs the App-ID application after receiving bundle messages 5 and 6.

After installing the first applications by means of the above method, the first switch 20a can handle the data streams. When the first switch 20a receives external data streams, the agent module 204 establishes a processing task for the first applications and communicates with the first applications via a network socket named "Socket Network". A Packet-Out message is transmitted to the agent module 204 of the first switch 20a. The agent module 204 receives the Packet-Out message, establishes the processing task for the first applications, and communicates with the first applications via the Socket Network to transmit the Packet-Out message. The first applications receive the Packet-Out message and determine whether the Packet-Out message is identified. The applications send the processing flow of the Packet-Out message to the agent module 204 to process data streams when such data streams are identified. If the Packet-Out message is not identified, the Packet-Out message is transmitted to another application from the first applications for further processing. The agent module 204 transmits the Packet-Out message to the control device 10 for processing when none of the first applications are able to identify the Packet-Out message. For example, the Layer2 learning program is installed in first switch 20a. When the Layer2 learning program receives a Packet-Out message that can be identified, the Layer2 learning program has the authority, based on being able to make an identification, to request the agent module 204 of the first switch 20*a* to add, delete or modify a flow table, and process related ports.

In another embodiment, the management module 100 of the control device 10 detects a network state of the first switch 20*a*. The control module 104 of the control device 10 transmits the bundle information for sending the first applications after the selection module 102 of the control device 10 selects the first applications according to the network state. In addition, in other embodiments, the query module 200 of the first switch 20*a* sends a request to the control device 10 requesting application installation. The selection module 102 of the control device 10 receives the request transmitted by the first switch 20*a* and selects the first applications, and divides a third application from the first applications into blocks. The control module 104 of the control device 10 transmits the bundle information to send the first applications.

Figure 4:
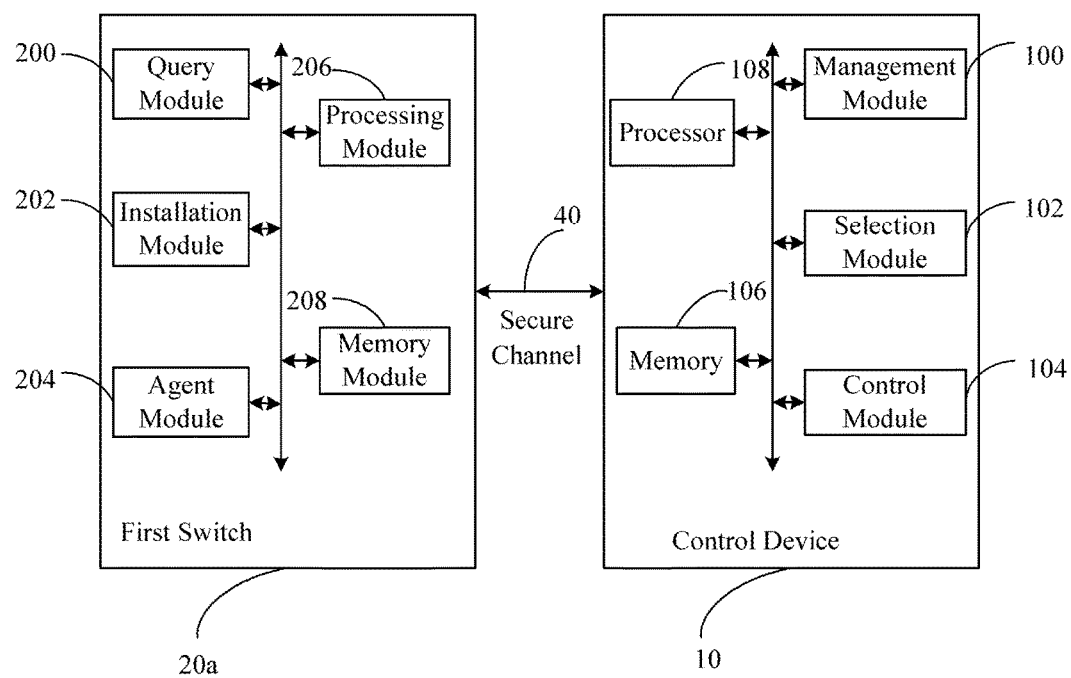
FIG. 4 is a block diagram of another embodiment of function modules of the control device and the first switch of FIG. 2.

FIG. 4 is a block diagram of another embodiment of function modules of the control device 10 and the first switch 20*a*. In this embodiment, the control device 10 comprises a management module 100, a selection module 102, a control module 104, a processor 108, and a memory 106. The first switch 20*a* comprises a query module 200, an installation module 202 and an agent module 204, a processing module 206, and a memory module 208. The management module 100, the selection module 102, the control module 104, the query module 200, the installation module 202 and the agent module 204 act like the modules shown in FIG. 4. The memory 106 stores software and receives data streams from each of the modules of the control device 10. The processor 108 executes the software to achieve the functions of the modules of the control device 10. The memory module 208 stores the software, the received data streams, and other information of the modules of the first switch 20*a*. The processing module 206 executes the software to achieve functions of the modules of the first switch 20*a*.

The address resolution application which is configured to identify the address resolution request is installed in the first switch 20*a*. When the first switch 20*a* receives a request for address analysis, the request is sent to the address analysis application for direct processing without communications between the switch 20*a* and the control device. Thus, the first switch 20*a* need not send an address analysis request to the control device 10 and does not need to wait for the control device 10 to send a control command to get a processing method. When the first applications are installed in the switch 20*a*, the problem of data streams being repeatedly transmitted between the control device and the switch is overcome. The data streams between the switch and control device can be reduced greatly since multiple applications are installed in the first switch 20*a*. Accordingly, the problem of a limited communication speed between the switch 20*a* and the control device 10 due to the out-of-band signal management port of the switch is resolved.

Figure 5:
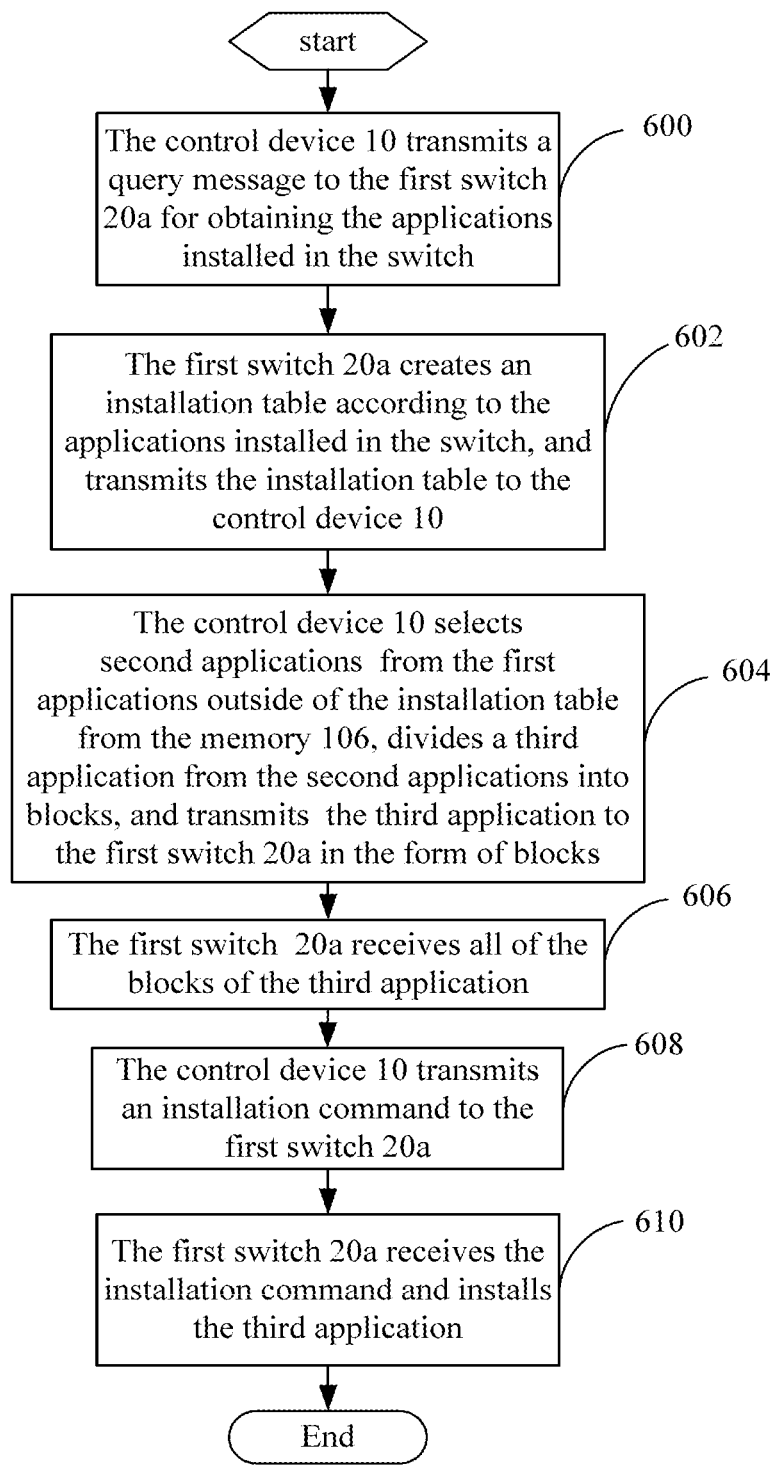
FIG. 5 is a flowchart of an embodiment of an implementation method for installing first applications in the first switch enabled by the control device of FIG. 2.

FIG. 5 is a flowchart of an implementation method of the control device 10 enabling the installation of the first applications in the first switch 20*a*. The process shown in FIG. 4 is implemented by the operating environment shown in FIG. 2 and the functional modules shown in FIG. 3 and FIG. 4.

In step S600, the management module 100 of the control device 10 transmits a query message to the first switch 20*a* for obtaining applications installed in the switch.

In step S602, the query module 200 of the first switch 20*a* receives the query message from the control device 10, creates an installation table according to the applications installed in the switch, and transmits the installation table to the control device 10.

In step S604, the selection module 102 of the control device 10 receives the installation table, selects second applications from the first applications outside of the installation table from the memory 106, divides a third application from the second applications into blocks, and transmits the third application to the first switch 20*a* in the form of blocks.

In step S606, the installation module 202 of the first switch 20*a* receives all of blocks of the third application.

In step S608, the control device 10 transmits an installation command to the first switch 20*a*.

In step S610, the first switch 20*a* installs and activates the third application when receiving the installation command.

Figure 6:
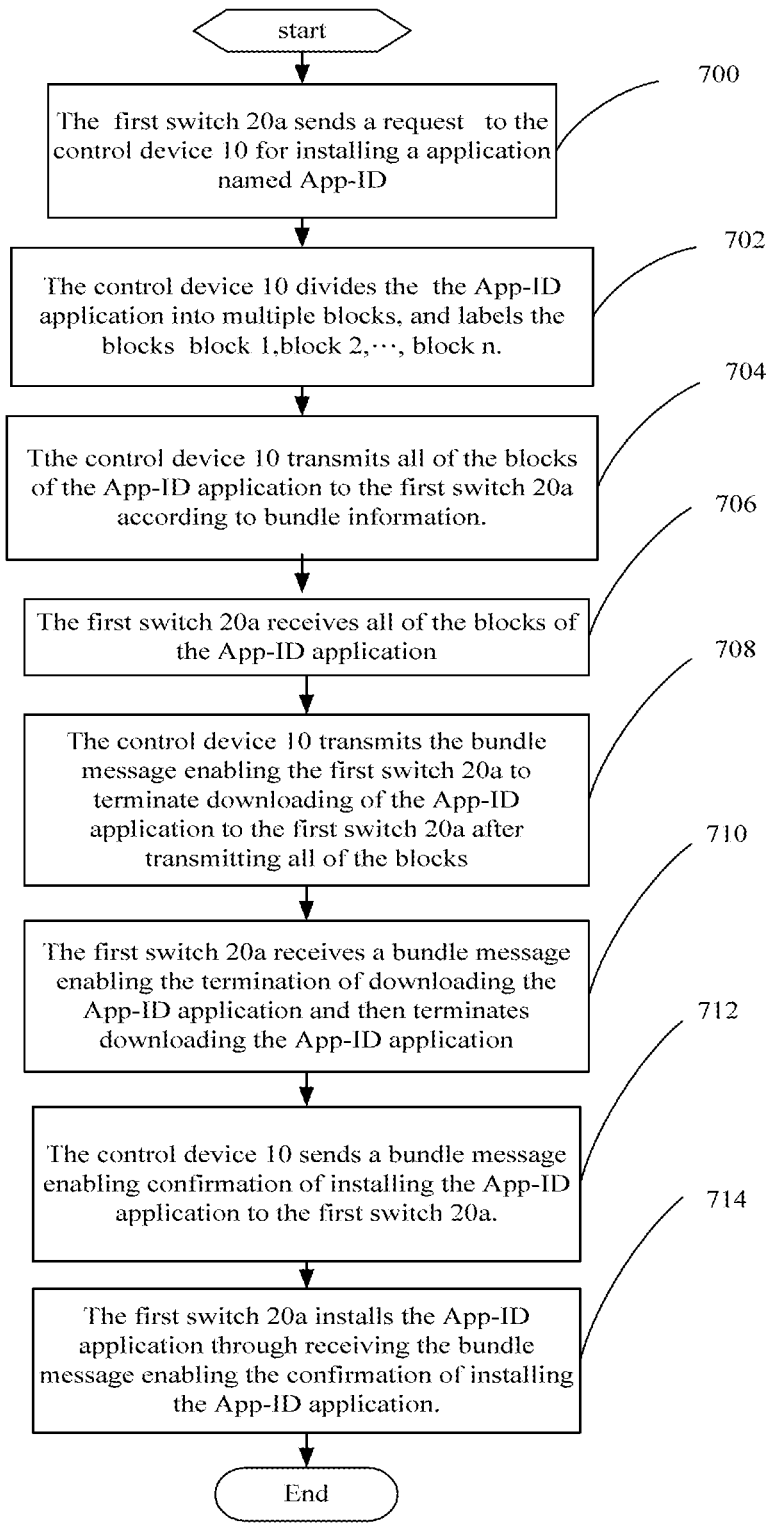
FIG. 6 is a flowchart of another embodiment of an implementation method for installing first applications in the first switch enabled by the control device of FIG. 2.

FIG. 6 is a flowchart of the other embodiment of the control device 10 controlling the first switch 20*a* to install the first applications. The process shown in FIG. 6 is implemented by the network architecture of the operating environment shown in FIG. 2 and the functional modules shown in FIG. 3 and FIG. 4.

In step S700, the query module 200 of the first switch 20*a* sends a request to the control device 10 for installing an application named App-ID through.

In step S702, the selection module 102 of the control device 10 receives the request from the first switch 20*a* and selects at least one designated application, the App-ID application, for example, from the first applications, divides the App-ID application into multiple blocks, and labels the blocks block 1, block 2, . . . , block n.

In step S704, the control module 104 of the control device 10 transmits all of blocks of the App-ID application to the first switch 20*a* according to bundle information.

In step S706, the installation module 202 of the first switch 20*a* receives all of the blocks of the App-ID application.

In step S708, the control module 104 of the control device 10 transmits the bundle message enabling the first switch 20*a* to terminate downloading the App-ID application to the first switch 20*a* after transmitting all of the blocks of the App-ID application.

In step S710, the installation module 202 of the first switch 20*a* receives a bundle message enabling the termination of downloading the App-ID application and then terminates downloading the App-ID application.

In step S712, the control module 104 of the controls device 10 sends a bundle message enabling confirmation of installing the App-ID application to the first switch 20*a*.

In step S714, the installation module 202 of the first switch 20*a* installs the App-ID application through receiving the bundle message enabling the confirmation of installing the App-ID application.

After installing the first applications by means of the above implementation method, the first switch 20*a* can process the received data streams. The specific process is shown in FIG. 7.

Figure 7:
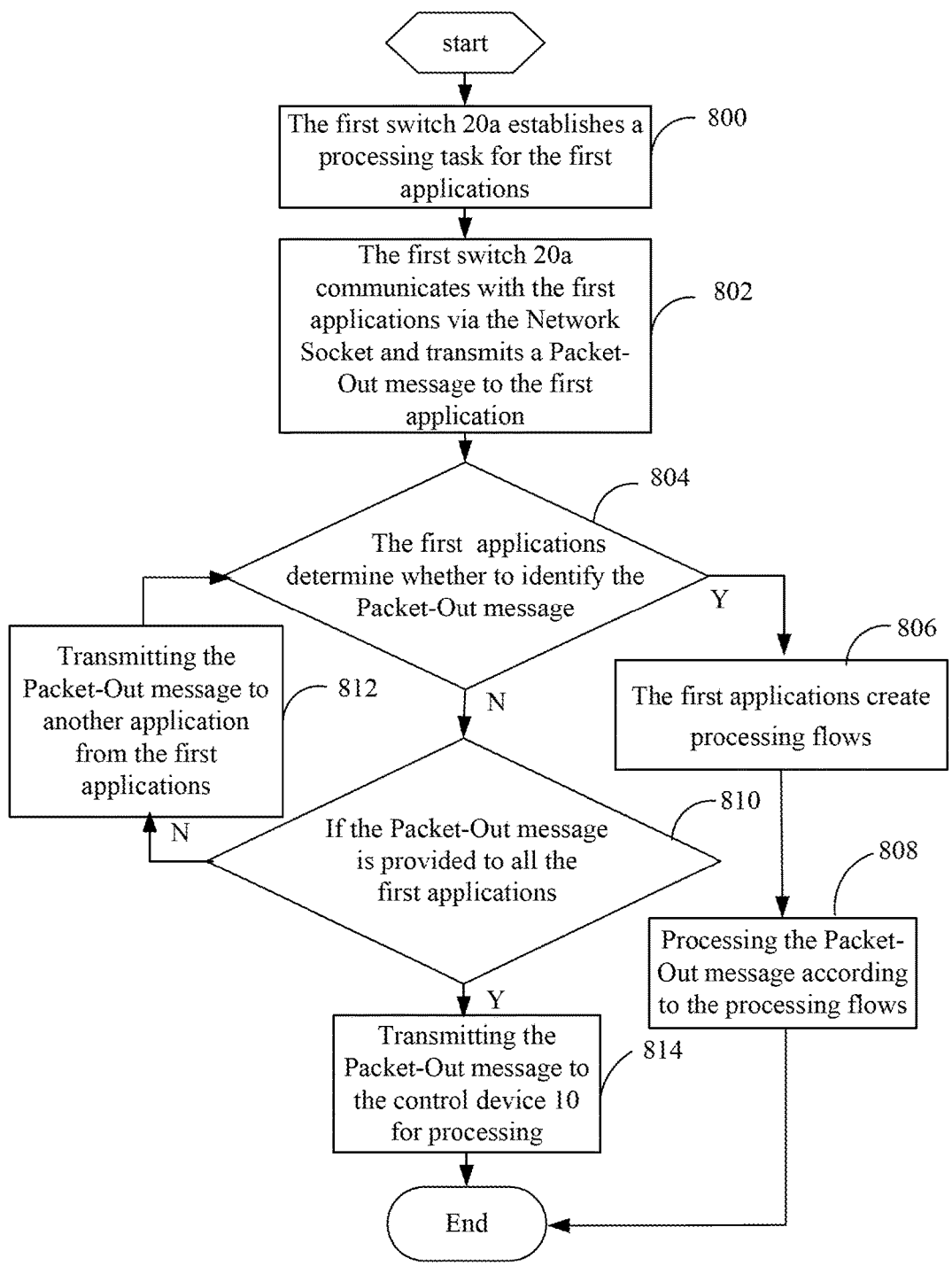
FIG. 7 is a flowchart of an embodiment of an implementation of the processing of the data streams using the first switch.

FIG. 7 is a flowchart of an implementation of the first switch 20*a* processing the data streams. The process shown in FIG. 7 is implemented by the network architecture shown in FIG. 1 and the functional modules shown in FIG. 3 and FIG. 4.

In step S800, the agent module 204 of the first switch 20*a* establishes a processing task for the first applications.

In step S802, the agent module 204 of the first switch 20a communicates with the first applications via the Network Socket and transmits a Packet-Out message to the first applications.

In step S804, the first applications receive the Packet-Out message and determines whether to identify the Packet-Out message.

In step S806, the first applications send a processing flow of the Packet-Out message to the agent module 204 when such Packet-Out message is identified.

In step S808, the agent module 204 receives the processing flow and processes the Packet-Out message, for example, creating a flow table.

In step S810, if the Packet-Out message is not identified, the agent module 204 determines whether the Packet-Out message is provided to the first applications of the first switch 20a.

In step S812, if the Packet-Out message is not provided to all the first applications of the first switch 20a, the agent module 204 transmits the Packet-Out message to another application from the first applications for an identification.

In step S814, if the Packet-Out message is provided to all the first applications of the first switch 20a, the agent module 204 transmits the Packet-Out message to the control device 10 for further processing.

The control device 10, the first switch 20a and the management method of the invention can simplify the data transmitting process between the control device 10 and the first switch 20a, improving the transmission speed of the data streams between control devices and switches. The first switch 20a can independently complete the partial data flow process to reduce the burden of the processor of the control device 10. The first switch 20a can install an application configured to process the data streams to the first switch 20a to reduce the processing time and the burdens of the control device 10. The control device 10 can install different applications according to the performance and process requirements of the first switch 20a, improving the data processing ability. When the control device 10 is out of work, the first switch 20a can process the data streams using the applications to make the data streams processed correctly.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A control device communicating with a switch, the device comprising:
   at least one processor;
   a non-transitory storage system coupled to the at least one processor and configured to store one or more programs that are to be executed by the at least one processor, wherein the non-transitory storage system further are configured to store a plurality of applications configured to process data streams received by the switch, the one or more programs comprise instructions for:
      receiving a request for downloading first applications, from the switch;
      selecting the first applications from the plurality of applications;
      transmitting the first applications to the switch;
      transmitting a command to the switch for installing the first applications in the switch;
      transmitting a query message to the switch for retrieving an installation table from the switch;
      receiving the installation table;
      selecting second applications from the a plurality of applications according to the installation table, wherein the second applications are not included in the installation table;
      transmitting the second applications to the switch; and
      transmitting a command to the switch for installing the second applications in the switch.

2. The control device of claim 1, wherein the one or more programs further comprise instructions for:
   dividing a third application from the first applications into multiple blocks;
   labeling the blocks; and
   sequentially transmitting the labeled blocks to the switch in order of labels according to bundle information.

3. The control device of claim 2, wherein the bundle information comprises a signaling type, an application name and a block label.

4. A switch, communicating with a control device, comprising:
   at least one processor;
   a non-transitory storage system coupled to the at least one processor and configured to store one or more programs that are executed by the at least one processor, the one or more programs comprise instructions for:
      sending a request about first applications to the control device for downloading the first applications;
      receiving the first applications from the control device;
      receiving a command from the control device for installing the first applications;
      establishing a processing task for the first applications; and
      communicating with the first applications and providing data streams to the first applications;
      receiving a query message from the control device for retrieving an installation table from the switch; and
      creating the installation table according to applications installed in the switch; and
      sending the installation table to the control device;
      receiving second applications, wherein the second applications are not included in the installation table; and
      receiving a command from the control device for installing the second applications.

5. The switch of claim 4, wherein the data stream is a Packet-Out message.

6. The switch of claim 4, wherein the step of receiving a command further comprises:
   receiving N blocks composing a third application from the first applications, wherein each of the N blocks is provided with a label; and
   sequentially transmitting the N blocks according to bundle information.

7. The switch of claim 6, wherein the bundle information comprises a signaling type, an application name and a block label.

8. The switch of claim 4, wherein the one or more programs comprise instructions for:
   configuring one application from the first applications to receive data streams;

determining whether the data streams are identified;
generating a processing flow for the data streams when the data streams are identified;
receiving the process flow; and
processing the data streams according to the process flow.

9. The switch of claim 8, wherein the one or more programs further comprise instructions for:
sending the data streams to another application from the first applications for processing when the data streams are not identified.

10. The switch of claim 9, wherein the one or more programs further comprise instructions for:
sending the data streams to the control device when none of the first applications are able to identify the data streams.

11. A management method of a control device, the control device communicates with a switch, the control device comprises a non-transitory storage system configured to store a plurality of applications configured to process data streams received by the switch, the method comprising:
receiving a request for downloading first applications, from the switch;
selecting the first applications from the plurality of applications;
transmitting the first applications to the switch; and
transmitting a command to control the switch for installing the first applications in the switch transmitting a query message to the switch for retrieving an installation table from the switch;
receiving the installation table;
selecting second applications from the plurality of applications according to the installation table, wherein the second applications are not included in the installation table;
transmitting the second applications to the switch; and
transmitting a command to the switch for installing the second applications in the switch.

12. The management method of claim 11, further comprising:
dividing a third application from the first applications into blocks;
labeling the blocks; and
sequentially transmitting the blocks to the switch in order of labels according to bundle information.

13. The management method of claim 12, wherein the bundle information comprises a signaling type, an application name and a block label.

14. A management method of a switch, the switch communicates with a control device, the method comprising:

sending a request about first applications to the control device for downloading the first applications;
receiving first applications from the control device;
receiving a command form the control device for installing the first applications;
establishing a processing task for the first applications;
communicating with the first applications and providing data streams to the first applications;
receiving a query message from the control device for retrieving an installation table from the switch; and
creating the installation table according to applications installed in the switch; and
sending the installation table to the control device;
receiving second applications, wherein the second applications are not included in the installation table; and
receiving a command from the control device for installing the second applications.

15. The management method of claim 14, wherein the data streams is a Packet-Out message.

16. The management method of claim 14, wherein the step of receiving a command further comprises:
receiving N blocks comprising a third application, wherein each of the N blocks is provided with a label; and
sequentially transmitting the blocks according to bundle information.

17. The management method of claim 16, wherein the bundle information comprises a signaling type, an application name, and a block label.

18. The management method of claim 14, further comprising:
configuring one application from the first applications to receive the data streams;
determining whether the data streams are identified;
generating a processing flow for the data streams when the data streams are identified; and
receiving the process flow; and
processing the data streams according the processing flow.

19. The management method of claim 14, further comprising:
sending the data streams to another application from the first applications for processing when the data streams are not identified.

20. The management method of claim 19, further comprising:
sending the data streams to the control device when none of the first applications are able to identify the data streams.

* * * * *